United States Patent [19]

Brown et al.

[11] Patent Number: 4,989,524
[45] Date of Patent: Feb. 5, 1991

[54] DIBBER DRILLS

[75] Inventors: Frank R. Brown, Shefford; Derek J. Frost, North Brickhill, both of England

[73] Assignee: National Research Development Corporation, London, England

[21] Appl. No.: 508,471

[22] Filed: Apr. 13, 1990

Related U.S. Application Data

[63] Continuation of Ser. No. 279,622, Dec. 5, 1988, abandoned.

[30] Foreign Application Priority Data

Dec. 8, 1987 [GB] United Kingdom ................ 8728622

[51] Int. Cl.$^5$ ................................................ A01C 5/04
[52] U.S. Cl. ...................................... 111/91; 111/904; 111/77
[58] Field of Search ..................... 111/89, 90, 91, 92, 111/77, 93, 94, 95, 34, 96, 1, 903, 904

[56] References Cited

U.S. PATENT DOCUMENTS

| | | | |
|---|---|---|---|
| 455,290 | 6/1891 | Mormand | 111/90 |
| 3,927,400 | 12/1975 | Knepler | 111/903 X |
| 3,982,661 | 9/1976 | Feltrop | 111/89 |
| 4,159,064 | 6/1979 | Hood | 111/1 |
| 4,444,130 | 4/1984 | Ray | 111/77 |
| 4,646,961 | 3/1987 | Grosse-Schermann et al. | 111/904 X |
| 4,928,607 | 5/1990 | Luigi | 111/926 X |

FOREIGN PATENT DOCUMENTS

| | | | |
|---|---|---|---|
| 101052 | 9/1925 | Austria | 111/91 |
| 1457873 | 10/1969 | Fed. Rep. of Germany . | |
| 3130795 | 7/1983 | Fed. Rep. of Germany | 111/91 |
| 3408605 | 5/1985 | Fed. Rep. of Germany | 111/91 |
| 988074 | 8/1951 | France . | |
| 447495 | 4/1949 | Italy | 111/91 |
| 1436008 | 5/1976 | United Kingdom . | |
| 1575304 | 9/1980 | United Kingdom . | |
| 2103463 | 2/1983 | United Kingdom . | |
| 2126063 | 3/1984 | United Kingdom . | |

OTHER PUBLICATIONS

Accord-Fahse—The Optimum Answer to Beet Drilling—Monopill Precision Seed Drill, 6 pages.
Vegetable Machinery, "Designs on Direct Drilling", Geoff Lawson, Jul. 1988.
Studies on Ensuring the Fiel Emergence of Sugar Beet Under Standard Conditions of Practice, Flake, Apr. 1980, National Institute of Agricultural Engineering.

*Primary Examiner*—Danton D. DeMille
*Attorney, Agent, or Firm*—Cushman, Darby & Cushman

[57] ABSTRACT

A metering and dibbing assembly for use in a dibber drill comprises a rotary feed section, inlet means for introducing seed at successive seed-retaining locations in the rotary feed section, a rotary dibber section having a plurality of dibber elements at least in part housed in radially disposed bores in the dibber section, and cam means operative to withdraw successive dibber elements to allow the transfer of seed from the feed section into the associated bores for these elements and thereafter to move the dibber elements in a radially outward movement so as to press the seed into the ground.

16 Claims, 7 Drawing Sheets

DIBBER DRILLS

This is a continuation of U.S. application No. 07/279,622, filed Dec. 5, 1988 now abandoned.

The present invention relates to dibber drills, that is to say to machines which in operation press a hole in the ground with the seed to be planted in or on the consolidated soil at the bottom of the hole.

Rotary planters of this type are already known in which seeds are punch-planted into the ground. Once embedded in the soil, adhesion forces prevent the seeds from being withdrawn with the punch.

According to the present invention, a metering and dibbing assembly for use in a dibber drill comprises a rotary feed section, inlet means for introducing seed at successive seed-retaining locations in the rotary feed section, a rotary dibber section having a plurality of dibber elements at least in part housed in radially disposed bores in the dibber section, and cam means operative to withdraw successive dibber elements to allow the transfer of seed from the feed section into the associated bores for these elements and thereafter to move the dibber elements in a radially outward movement so as to press the seed into the ground.

Conveniently, the seed-retaining locations comprise a plurality of apertures or slots extending through from side to side of the rotary feed section e.g. at points spaced radially inwardly of its periphery.

Conveniently, seed is transferred through the feed section to the dibber element bores without any substantial seed movement radially of the dibber section.

Conveniently, the seed-retaining apertures are sealed off by adjacent parts of the assembly except when they occupy those positions at which the transfer of seeds to or from the apertures is desired.

Conveniently, a transfer means is provided for positively transferring seeds from the feed section to the radially disposed bores in the dibber section.

Conveniently, the transfer means is programmable so as to operate either at every or at preselected ones of the seed-retaining locations e.g. every second, third or fourth etc. such location.

A convenient transfer means comprises a pulsed air supply e.g. under the control of a microprocessor or other transfer control means which can be instructed to pulse the air as appropriate to transfer seed from the desired seed-retaining locations.

Conveniently, there are a prime number of said seed-retaining locations in the feed section, twenty three being the currently preferred value.

Normally, the number and angular spacing of the seed-retaining locations and the dibber elements will be the same and may be provided by different regions of the same part of the assembly or by different parts rotationally coupled together.

Conveniently, the assembly includes a timing disc in which apertures disposed in correspondence with the seed-retaining locations in the feed section are sensed by a photo-electric device and the signals used to activate the transfer means.

The desired radial motion of the dibber elements is conveniently controlled by a cam surface. Conveniently, this cam surface may be shaped to provide a rapid in and out movement of the dibber elements into the ground.

Alternatively, or additionally, the cam surface may be shaped so as to move the dibber elements to block off the inlet apertures to the newly-loaded dibber bores to prevent seeds rolling back into the inlet apertures.

The invention also includes a dibber drill incorporating the metering and drilling assembly of the present invention.

Embodiments of the invention will now be described, by way of example only, with reference to the accompanying somewhat diagrammatic drawings in which.

Figure 1:
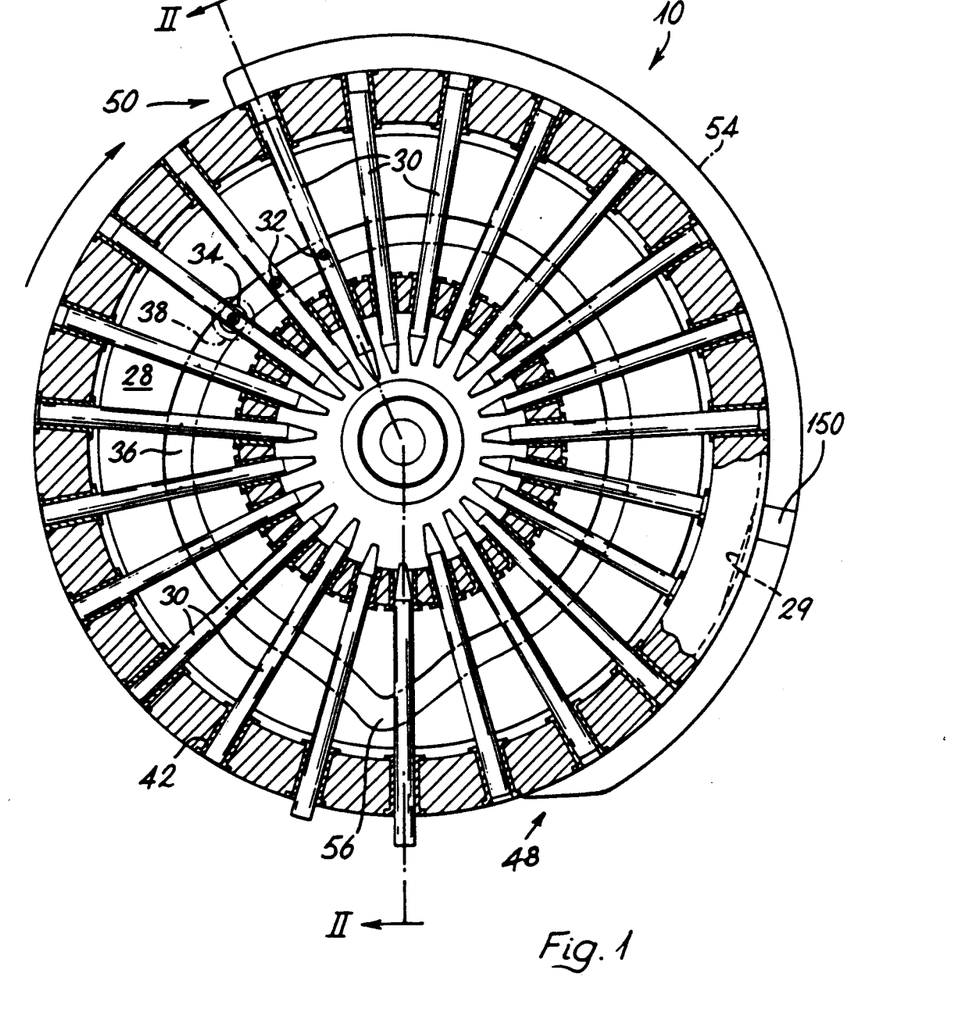
FIG. 1 is a side view of a rotary metering and dibber assembly for use in a dibber drill according to the present invention.
Figure 2:
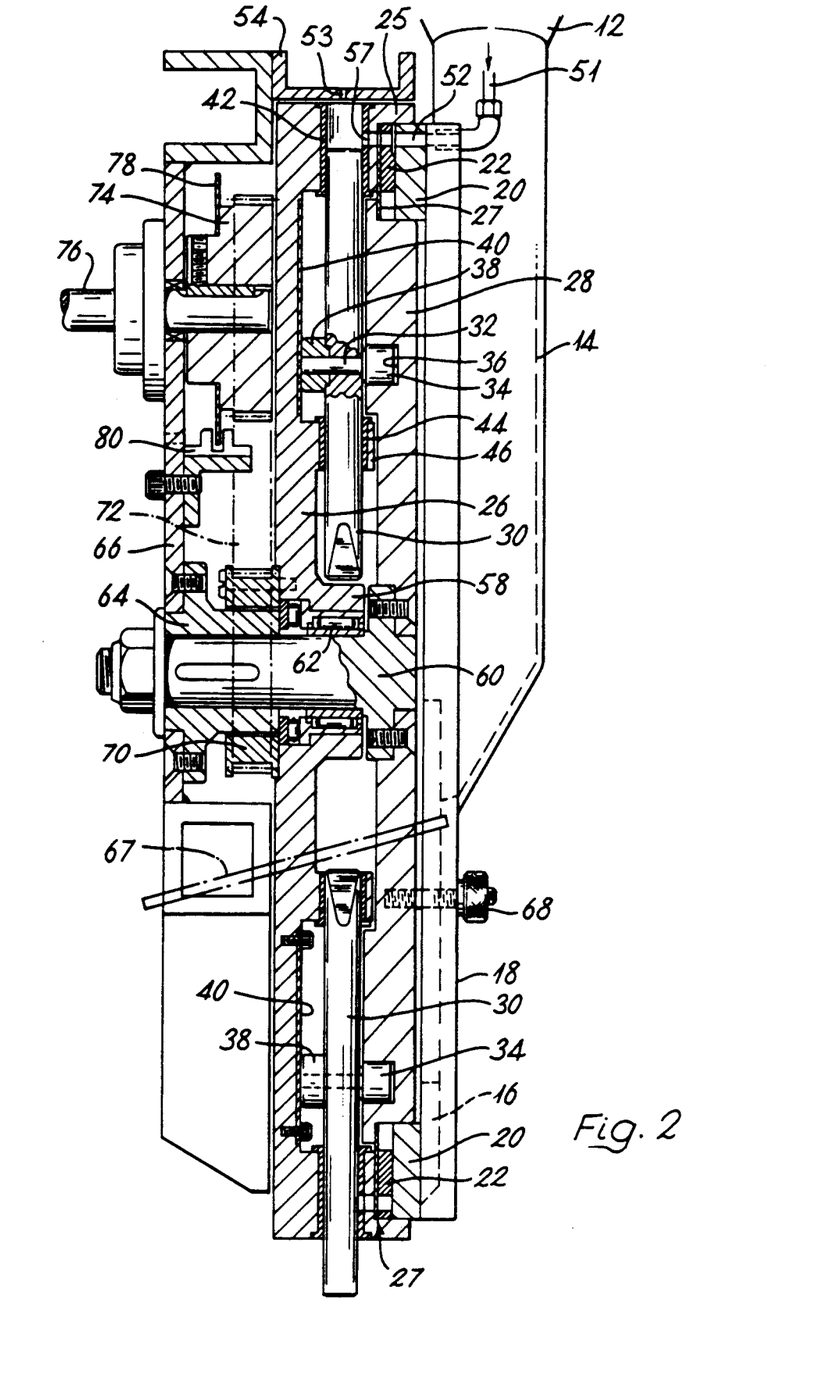
FIG. 2 is a section taken along the line II—II of FIG. 1.

Thus referring first to FIGS. 1 and 2, a rotary metering and dibber assembly 10 is associated with a seed hopper 12 connected via a tube 14 with an arcuate seed chamber 16 in a circular cover plate 18 of the assembly.

A single aperture air inlet ring 20 engages a multi-apertured rotatable cell ring 22. The exact form of ring 22 is better understood from FIG. 3 from which it will be seen that it has twenty three apertures 23, each preceded (on rotation of the ring) by a lead-in groove 24. As will be evident from the drawing, each aperture 23 inclines rearwardly of the direction of rotational movement of the cell ring 22 e.g. at an angle of about 30° to the face of the cell ring. This encourages seed capture.

Figure 3:
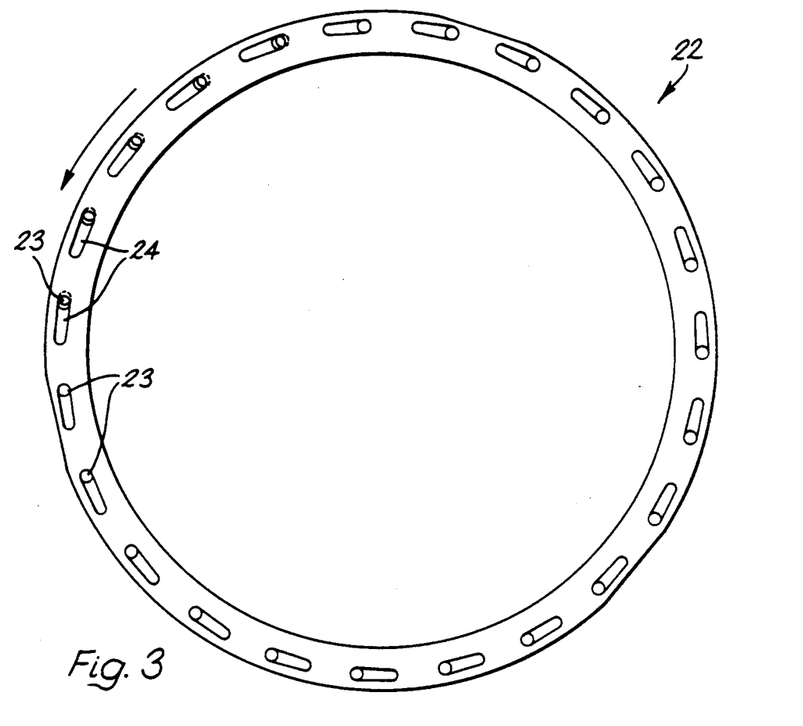
FIG. 3 shows on a larger scale the cell ring used in the assembly of FIGS. 1 and 2.

The arcuate arrows in FIGS. 1 and 3 indicate the direction of rotation of the items concerned.

Returning now to FIG. 2, the rim 25 of a so-called dibber wheel 26 surrounds the outer periphery of a stationary cam plate, a single aperture phosphor bronze transfer ring 27 being fixed to the inner face of the cam plate (28) and sandwiched against the cell ring 22. Locating lugs (such as lug 29) on the dibber wheel 26 engage corresponding flats (visible in FIG. 3) of the cell ring 22 so that any rotation of dibber wheel 26 will result in a corresponding rotation of the cell ring 22.

Each dibber element or "plunger" 30 carries a double-ended stud 32, one end carrying a roller 34 which runs in a cam track 36 in the plate 28 and the other end carrying a bearinq block 38 in sliding engagement with a phosphor-bronze backing ring 40 let into the circular base of the dibber wheel.

Each plunger 30 is free to slide in bearings 42 housed in the rim portion 25 of the dibber wheel 26 and in bearings 44 in a radially inner second flange portion 46 of the same wheel.

The bottom section of the seed chamber is apertured to allow the passage of a seed from the seed chamber 16 into the lead-in groove and associated cell ring aperture. As an optional feature used to encourage this movement and assist in emptying the seed chamber, the bottom section of the seed chamber slopes downwardly towards the centre line of the assembly i.e. from right to left as viewed in FIG. 2.

Rotation of the cell ring (in a clockwise sense as viewed in FIG. 1) will carry each seed-containing aperture of the cell ring upwardly from its loading position 48 near the bottom of the assembly and across the inner face of the seed chamber to a point 50 just before its highest position. At point 50, the cover plate 18, transfer ring 27, dibber wheel rim portion 25 and upper bearings 42 are similarly apertured to enable the air from an air supply tube 51 to blow the seed from the cell ring aperture into the bore for the associated plunger in dibber wheel 26 as shown for example at 52 in FIG. 2. The air then passes through the open end of bearing 42 to escape through a small slot 53 in an arcuate circumferentially disposed seed-retaining backing plate 54. The plate 54 is tapered at 50 to a thickness at which it just covers the open ends of bearings 42 over the bottom right quadrant of the dibber wheel 26 so that, as the seeds begin their downward travel, the backing plate 54 prevents their premature escape from the radial plunger bores in dibber wheel 26. The above-discussed structure forms an inlet means.

Conveniently, the dibber wheel assembly may be preceded by a V-shaped (in plan) soil scraper working well ahead of the dibber wheel to push aside any stones originally present in the path of the plungers 30. Optionally, the operating depth of the assembly is controlled by a separate depth control wheel (not shown), rather than by relying solely on the dibber wheel to perform this function.

In alternative embodiments (not shown), the air supply pipe 51 etc. are differently positioned so as to delay seed transfer e.g. until the dibber plunger aperture is covered by soil.

As the dibber wheel is rotating at ground-wheel speed (typical forward speeds during sowing would be up to 2 meters per second), there will be substantially no relative movement between the dibber wheel and ground and hence little or no tendency for the soil to dislodge the seed from its position beneath the plunger when this latter moves past the bottom edge of the backing plate 54 to begin the dibbing process. The plunger reaches maximum penetration just after the bottom dead centre position.

The shape of the cam track 36 in cam plate 28 may be seen from FIG. 1 from which two features should be noted. First, the downwardly extending "beak" 56 which produces a rapid in-and-out motion of the plunger as it passes its bottom position. Secondly the cam track is shaped to radially extend the plunger immediately after it passes through the seed transfer position 50. This quickly shuts off the plunger bearing inlet aperture 57 (shown open in FIG. 2, to prevent any possibility of the seed moving back into the inlet aperture 57.

To summarise, phosphor bronze transfer ring 27 forms an end wall to the cell ring apertures which prevents the seed entering the plunger bearings 42 prematurely and the outward movement of the dibber elements prevents the unlikely occurrence of the seeds becoming trapped in the dibber apertures 57.

The hub portion 58 of the plunger drum is supported on a central stationery axle member 60 of the assembly via a bearing assembly 62. This axle member also supports the cam plate 28 and an end block 64 on which is carried the back plate 66 of the assembly.

Reference numeral 67 indicates a scraper blade to clean the rim of dibber wheel 26.

The cover plate 18 is secured to the cam plate 28 by a hand nut 68 to facilitate removal of the cover plate e.g. for access to the transfer ring and/or cell ring. Access might be required, for example, for general maintenance or where a change in the seed type about to be sown means that the aperture sizes in the currently-mounted cell ring are no longer appropriate and a new cell-ring must be fitted.

The plunger drum 26 is driven from a central timing pulley 70 embracing but spaced from the axle member 60 and engaged by a toothed rubber belt 72 which is in turn driven from a toothed driving pulley 74. This latter is supported from the back plate 66 by an axle 76 which projects outwardly of the back plate for connection with an external drive, as shown in FIG. 4.

Mounted on a stepped portion of the driving pulley 74 (FIG. 1) is a copper timing disc 78 spanned by a photoelectric emitter/detector device 80. The disc 78 is apertured (2 mm holes) in correspondence with the cell ring 22 so that a pulse of light is received by the detector element of device 80 each time a cell ring aperture aligns with the adjacent apertures in the cover plate, transfer ring and plunger in the situation illustrated in FIG. 2. The output from device 80 may be fed into a micro-processor or like control. This can be instructed to actuate a solenoid which controls the valve in an airline to pipe 51 to provide an air pulse every second, third or fourth time. Alternatively the solenoid may be set permanently open etc.

Preferably there are a prime number of apertures in the cell ring so as to increase the loading time available for each aperture in the cell ring 22 and to reduce the effects of blockage if not every aperture alignment is being pulsed. One important outcome of using a prime number of cell ring apertures is that it, to some degree, compensates for any loss in seed-metering efficiency that would otherwise be brought about by the high forward speeds of which the machine is capable. Obviously there must be an identical number of apertures in the dibber wheel and timing disc 78.

Figure 4:
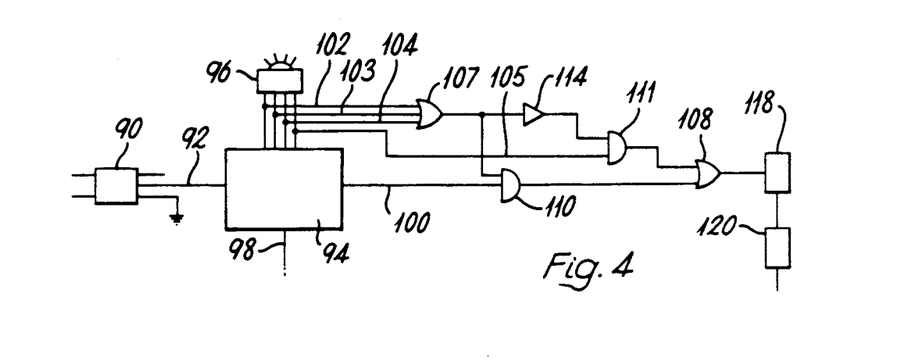
FIG. 4 is a block diagram illustrating control circuitry associated with the assembly of FIGS. 1 and 2.

Further details of the air pulse control circuit may be seen from FIG. 4.

Thus referring now to FIG. 4, a control circuit for controlling the air pulsing of the cell wheel 22 comprises an opto-switch 90 (the photoelectric device 80 of FIG. 2) which on rotation of the timing disc 78 will result in a continuous train of pulses being fed along input line 92 to an appropriate chip 94 for a 12 volt D.C. system. It will be understood that one pulse is produced each time that an aperture in the timing disc is detected by the photoelectric device 80.

The function of chip 94 is to divide the pulse count from opto-switch 90 by an amount set by a manually-operated hexadecimal control switch 96. Reference numeral 98 indicates a reset button operable to zero the output pulse count from divider chip 94.

In operation, the output of divider chip 94 will continually vary between two states (which will be referred to as "1" or "0") corresponding to the arrival or absence of a pulse at the chip 94 while lines 102, 103, 104, and 105 will be at one or other of two steady states (also referred to as "1" or "0") in dependence on the setting of control switch 96. Of these lines, line 105 will carry the "least significant bit" set by switch 96.

Turning now to the remainder of the circuit, reference numerals 107,108 indicate OR gates each of which will give an output of 1, only if one or more of its inputs are themselves 1. Otherwise the OR gates will each give an output of 0.

Reference numerals 110, 111 indicate AND gates each of which will give an output signal of 1 only if both the inputs are themselves 1. Otherwise the AND gates will each give an output of 0.

Reference numeral 114 indicates an inverter which produces a 1 state in response to a 0 state from OR gate 107, and vice versa.

The output of the gate 108 is fed to a power amplifier 118 which drives a solenoid 120. This latter is operative to open and close a valve in an air line (not shown) feeding the pipe 51 thereby to produce a pulse of air at 52.

If pulse conditioning is required, for example to give a longer pulse length, then a monostable is inserted immediately in front of the amplifier 118.

Those skilled in the art will be able to understand the logical operations of the various AND and OR gates which allow steady state conditions to be set at the solenoid.

Purely by way of example, suppose it is desired to set the control circuit in such a way that only every alternate pulse from the opto-switch 90 will activate the solenoid 120 to produce an air pulse. In this case, the hexadecimal control switch 96 is set so that lines 102,103 and 105 receive an output of 0 and only line 104 receives an output of 1 which will arrive at the gate 107 to result in a 1 output from that gate. This latter is applied as the steady input to AND gate 110 so as to permit selected alternate pulses from line 100 to pass through AND gate 110 and thereby pulse the solenoid as will be readily apparent.

In an alternative control arrangement (not shown), the solenoid 120 is replaced by a rotary switch driven by a stepper motor.

Figure 5:
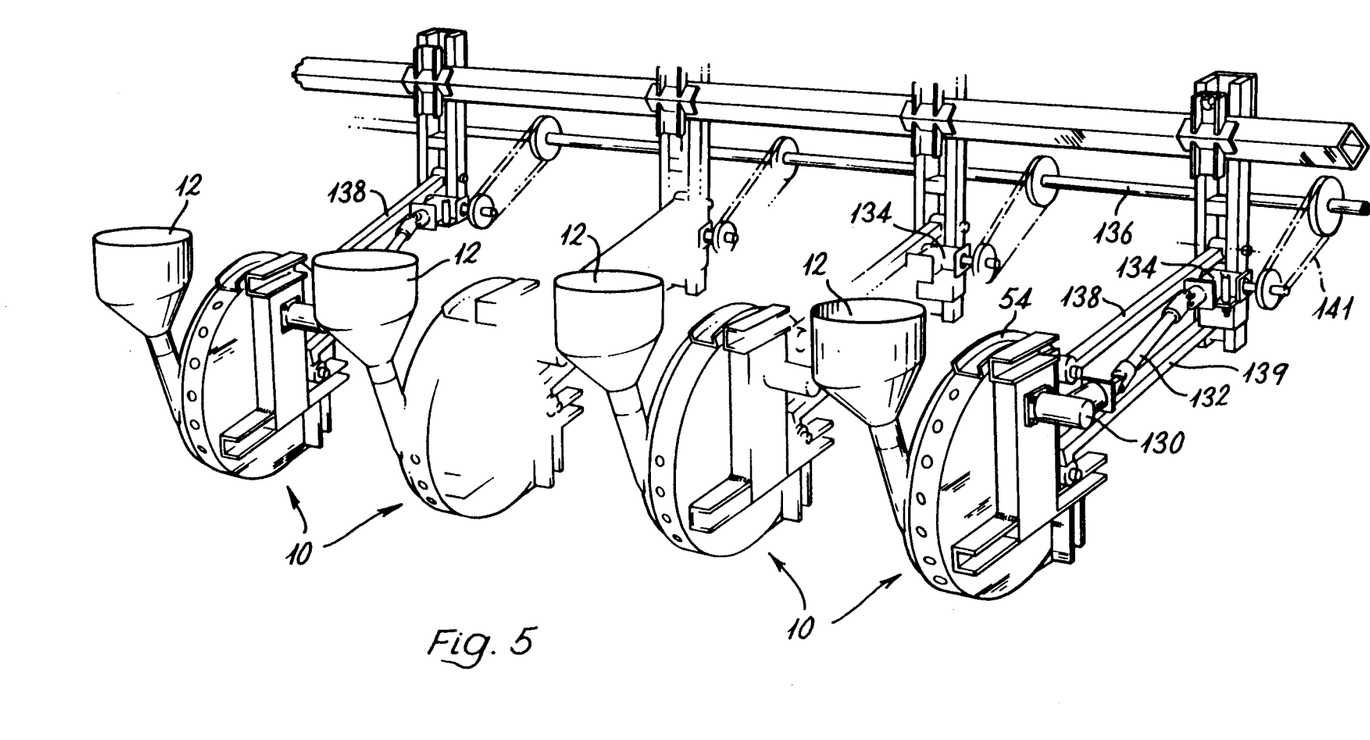
FIG. 5 is a perspective view of a complete drill incorporating a plurality of such assemblies.

Turning next to FIG. 5, this illustrates how a tractor-towed dibber drill might comprise a number of the dibber assemblies 10 mounted side-by-side. Typically, for example, there might be four such drill assemblies arranged for use on a 1.8 meter wide seed bed, the drills being symmetrically disposed about the centre-line of the seed bed with an inter-drill spacing of 38 cm. The external drive for each assembly 10 is derived from an associated right-angled gear box 130 driven through a universal coupling 132 from a second right-angled gear box 134 powered from a common lay shaft 136. This latter is driven in turn by land wheels on a toolbar on which the drill units are mounted.

Reference numerals 138,139 indicate parallel linkage suspensions for the assemblies 10 and reference numerals 141 indicate chain and sprocket (or pulley and belt) connections between shaft 136 and gear boxes 134.

Figure 6:
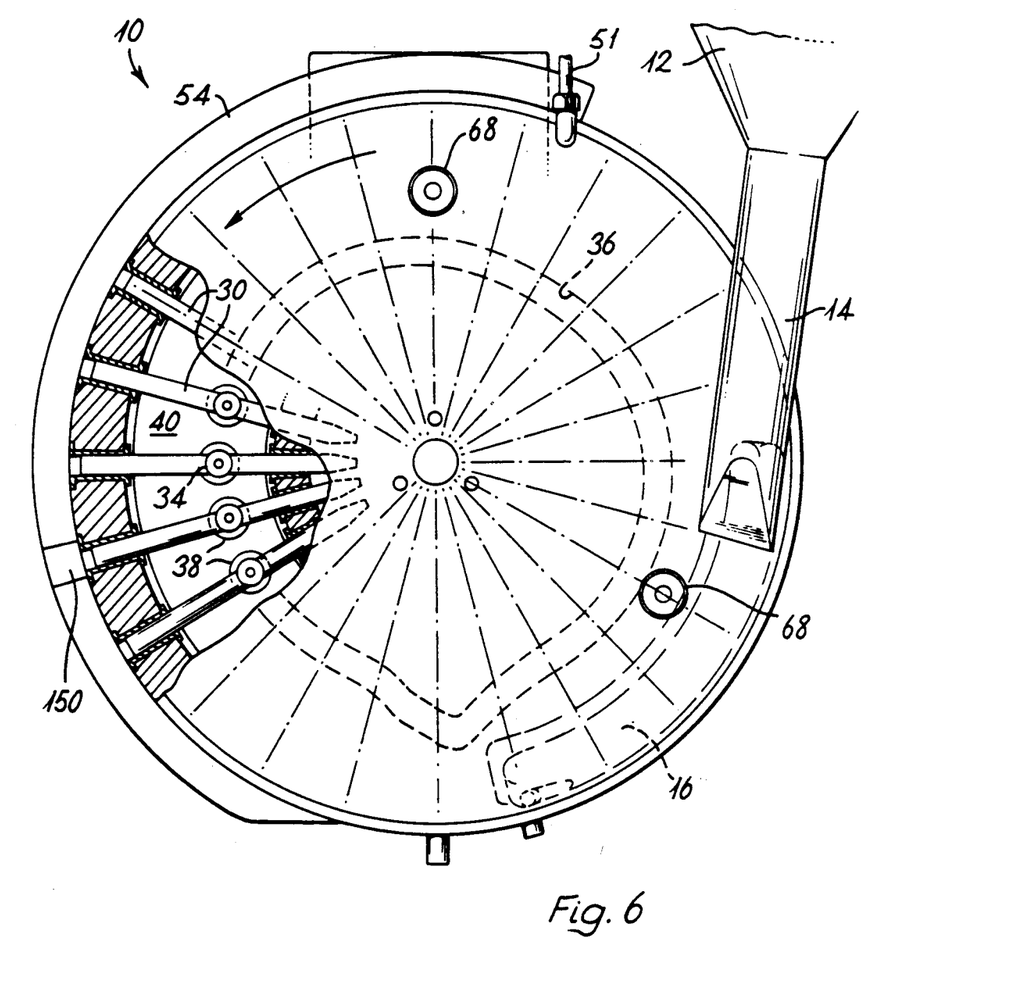
FIG. 6 is a part sectional view of an alternative design of metering and dibber assembly to that shown in FIGS. 1 and 2.

Clearly, although the currently preferred embodiment envisages the use of twenty three dibber elements, other numbers (whether prime or not) could be used instead, if desired. By way of example, FIG. 6 illustrates a twenty-four dibber element assembly viewed from the other side to the assembly of FIG. 1. Obviously, the number and positions of the cell ring apertures etc. will have to be correspondingly changed in such cases but this should pose no problem to those skilled in the art.

Figure 7:
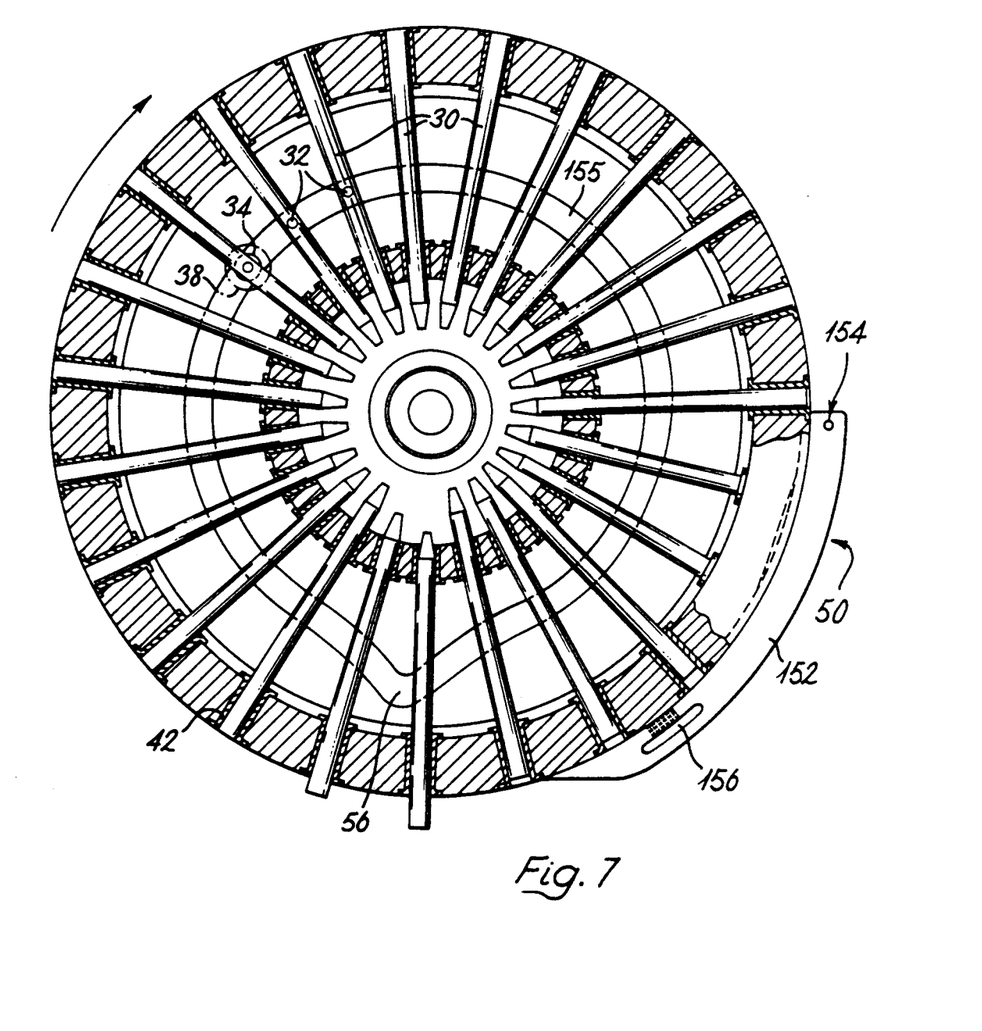
FIG. 7 is a side view of an alternative design of metering and dibber assembly to that of FIG. 1.

Turning now to FIG. 7, this shows a modification of the first embodiment in which the (full width) backing plate 152 has been shortened to act over only the bottom right quadrant of the dibber wheel 26. In this case, the shortened plate 152 is pivotted at its top end at 154 so as to improve its contact with the dibber wheel in the presence of wear on the inner face of plate 154. In addition, the shape of the cam track (155) has been modified to delay the radially inward withdrawal of the dibber elements 30 until they are covered by plate 152. Lastly, an air vent has been provided at 156. This vent comprises a circumferential slot cut into the lower end portion of the cover plate as indicated and a cluster e.g. twenty 1 mm diameter holes drilled radially of the dibber wheel to connect the slot with the inner face of the plate. In this way, the seed-bearing compartments of the wheels are vented to atmosphere prior to the operation of the dibber elements 30 to push the seeds into the ground.

Figure 8:
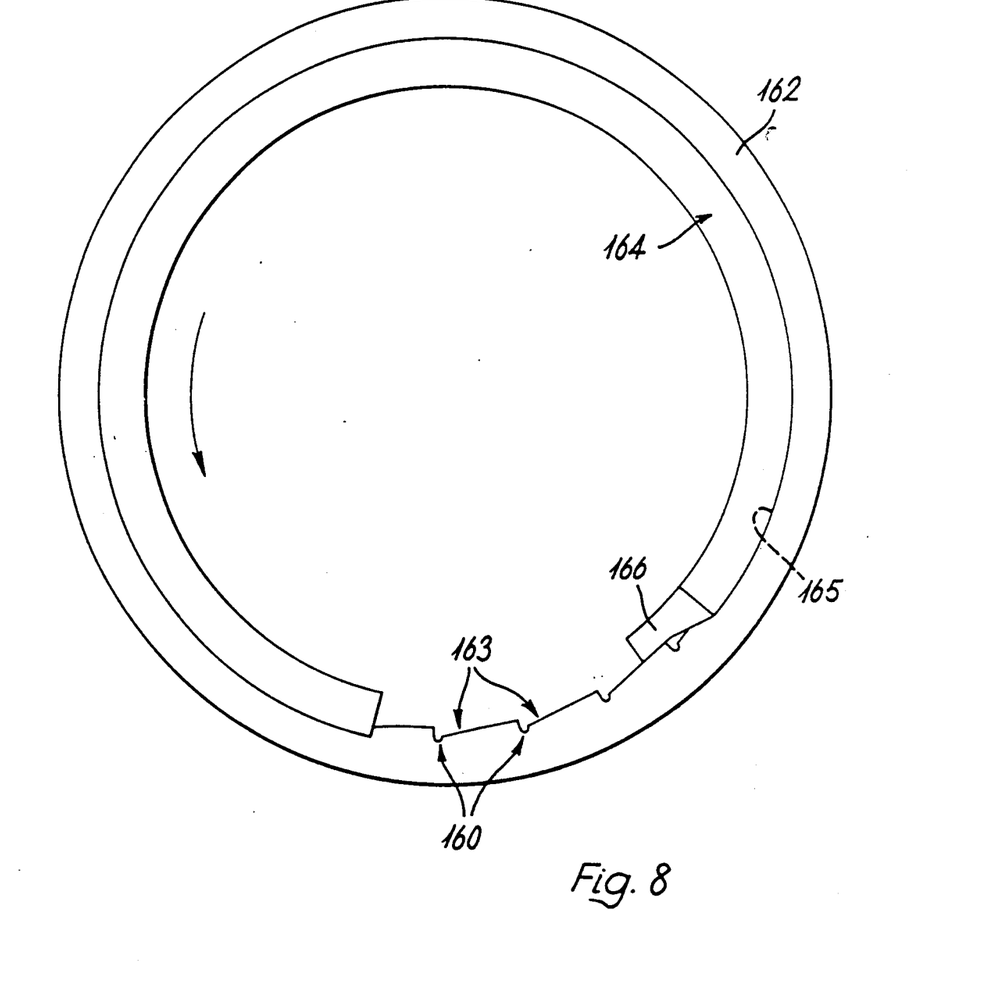
FIG. 8 shows on the same scale as FIG. 3 an alternative design of cell ring to that used in the earlier assemblies.

Referring now to FIG. 8, this illustrates an alternative design of cell ring assembly which can be used to replace the ring 22 of the earlier embodiments. It will be appreciated that corresponding dimensional changes in the co-operating parts of the apparatus may also be required.

The FIG. 8 design of cell ring assembly differs from item 22 principally in having its seed-retaining sites provided by open cells 160 formed on the inside circumference of the cell ring 162. "Lead-ins" 163 are formed down to half the diameter of the cell to assist in seed capture.

To prevent the subsequent escape of the seeds, the notched inner surface of the rotating ring 162 is radially backed by the annular spigot portion of a stationary seed-retention ring 164. A front flange portion 165 of retention ring 164 prevents escape of the seed in an axial forwards direction while escape in the contrary direction is prevented by the transfer ring 27.

A section of the retention ring is removed in the region of the seed hopper and the leading edge of the cut out is chamfered at 166 to wipe excess seed across the rear edge of the loaded cell thereby to prevent damage to seed as the cell moves round and under the retention ring spigot.

The engagement of the cell ring 162 with the retention ring spigot ensures that the captured seed is positively located radially within the apparatus and at an appropriate point in its travel, each cell will accurately connect with a transfer port as in the earlier embodiments.

The number of drills and their inter-row spacing is not critical and is to be chosen in accordance with the particular crop requirements and/or scale of farming activity. For example, a sugar beet grower might have 6, 9, 12, 15 up to a possible 24 dependent on the scale of operation.

Dibber systems of the sort above described would be useful, for example, in both intensive farming regimes (e.g. market gardening) for sowing lettuce, spring cabbage, red beet etc. and in extensive farming regimes e.g. for sowing brussel sprouts, cauliflower, sugar beet etc.

Although it might be thought that the required values for the seed-to-seed spacing would depend solely on the type of seed being sown, in practice, farmers and growers may well adjust their seed spacing in small increments away from these values dependent upon their judgement of the influence of ambient conditions on the likely % emergence. It is hoped that the apparatus of the present invention will provide a means of improving the predictability of emergence to a point at which this degree of flexibility is not required and the actual requirement on spacing more closely approaches the theoretically optimum spacing requirements of the plants.

Nevertheless, the apparatus of the present invention can offer a compromise on the seed spacing determined by the spacing of the dibbers. To obtain spacings which are multiples of the primary spacing there are two approaches, namely: (1) to have one seed-retaining aperture in the cell ring for each dibber element in the dibber wheel irrespective of the precise number of dibbers and then to use a transfer device to pulse-load the appropriate dibbers. This is the method used in the preferred embodiment of FIGS. 1 and 2. (2) to have the apparatus in all essential respects the same as that shown in FIGS. 1 and 2 but to have a different number of dibbers (e.g. 24) which offers a large number of submultiples (e.g. 2×2×3). In this case, the cell ring will be changed for each required combination. Thus a ring with 8 cells would be used for 150 mm seed spacing, say. One such apparatus (using 24 dibber elements) is in fact shown in FIG. 6 and has already been described above with reference to that Figure.

We claim:

1. A metering and dibbing assembly for use in a dibber drill comprising
   a rotary feed section having seed retaining locations therein,
   inlet means for introducing seed at said seed retaining locations in the rotary feed section,
   a rotary dibber section having a plurality of dibber elements at least in part housed in radially disposed bores in the dibber section,
   programmed transfer means for positively transferring seeds from the feed section to said radially disposed bores in the dibber section, wherein said programmed transfer means is programmed to operate at preselected ones of the seed retaining locations,
   programming means for programming said programmed transfer means to operate at said preselected ones of said seed retaining locations, and
   cam means operative to withdraw successive dibber elements to allow the transfer of seed from the feed section into the associated bores for these elements and thereafter to move the dibber elements in a radially outward movement so as to press the seed into the ground.

2. An assembly as claimed in claim 1 in which the seed-retaining locations comprise a plurality of openings extending from side to side of the rotary feed section.

3. An assembly as in claim 2 including a stationary transfer means comprising a major first portion effective to seal off openings in the rotary feed section and a minor second portion allowing communication of said openings with those radially disposed bores of the dibber section currently occupying a predetermined loading position for the bores.

4. An assembly as claimed in claim 2 in which there are a prime number of said seed-retaining locations in the feed section.

5. An assembly as claimed in claim 2 further comprising means for, in operation, transferring seed through the feed section to the dibber element bores without any substantial seed movement radially of the dibber section.

6. An assembly as in claim 5 including a stationary transfer means comprising a major first portion effective to seal off openings in the rotary feed section and a minor second portion allowing communication of said opening with those radially disposed bores of the dibber section currently occupying a predetermined loading position for the bores.

7. An assembly as claimed in claim 1 in which the transfer means comprises a pulsed air supply.

8. An assembly as claimed in claim 7 in which the pulsed air supply is under the control of a control means which can be instructed to pulse the air as appropriate to transfer seed from the desired seed-retaining locations.

9. An assembly as claimed in claim 7 in which the pulsed air supply is under the control of a control means which can be instructed to pulse the air as appropriate to transfer seed from the desired seed-retaining locations.

10. An assembly as claimed in claim 1 in which there are a prime number of said seed retaining locations in the feed section.

11. An assembly as claimed in claim 10 in which there are twenty three of said seed retaining locations.

12. An assembly as claimed in claim 1 in which the desired radial motion of the dibber elements is controlled by a cam surface.

13. An assembly as claimed in claim 12 in which the cam surface is shaped so as to move the dibber elements to block off inlet apertures to newly-loaded dibber bores to prevent seeds rolling back into the inlet apertures.

14. An assembly as claimed in claim 12 in which the cam surface is shaped to provide a rapid in and out movement of the dibber elements into the ground.

15. An assembly as claimed in claim 14 in which the cam surface is shaped so as to move the dibber elements to block off inlet apertures to newly-loaded dibber bores to prevent seeds rolling back into the inlet apertures.

16. A metering and dibbing assembly for use in a dibber drill comprising a rotary feed section having seed retaining locations therein, inlet means for introducing seed at said seed retaining locations in the rotary feed section, a rotary dibber section having a plurality of dibber elements at least in part housed in radially disposed bores in the dibber section, cam means operative to withdraw successive dibber elements to allow the transfer of seed from the feed section into the associated bores for these elements and thereafter to move the dibber elements in a radially outward movement so as to press the seed into the ground, and a timing disc in which apertures disposed in correspondence with the seed retaining locations in the feed section are sensed by a photo-electric device and the signals used to activate the cam means.

* * * * *